UNITED STATES PATENT OFFICE.

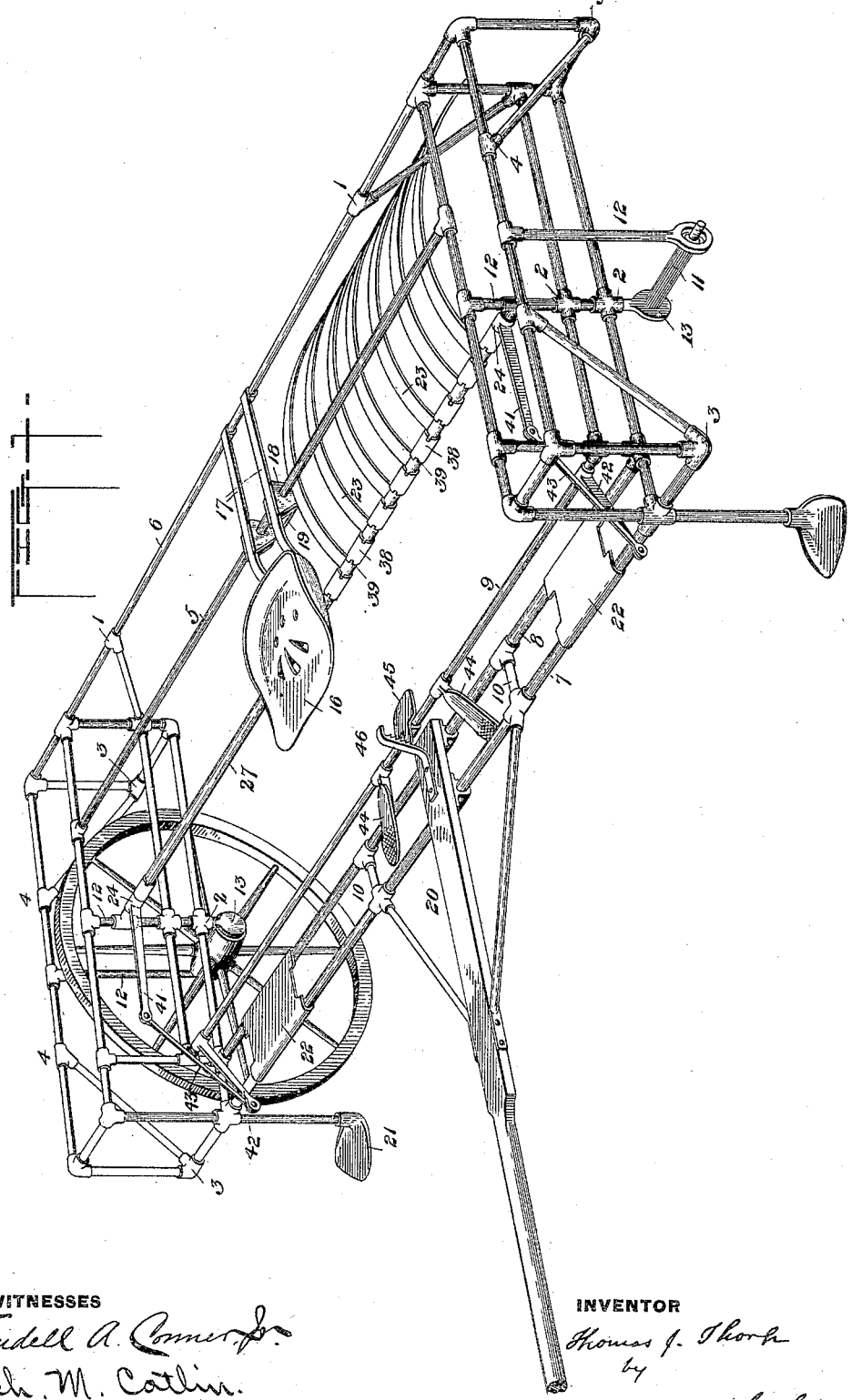

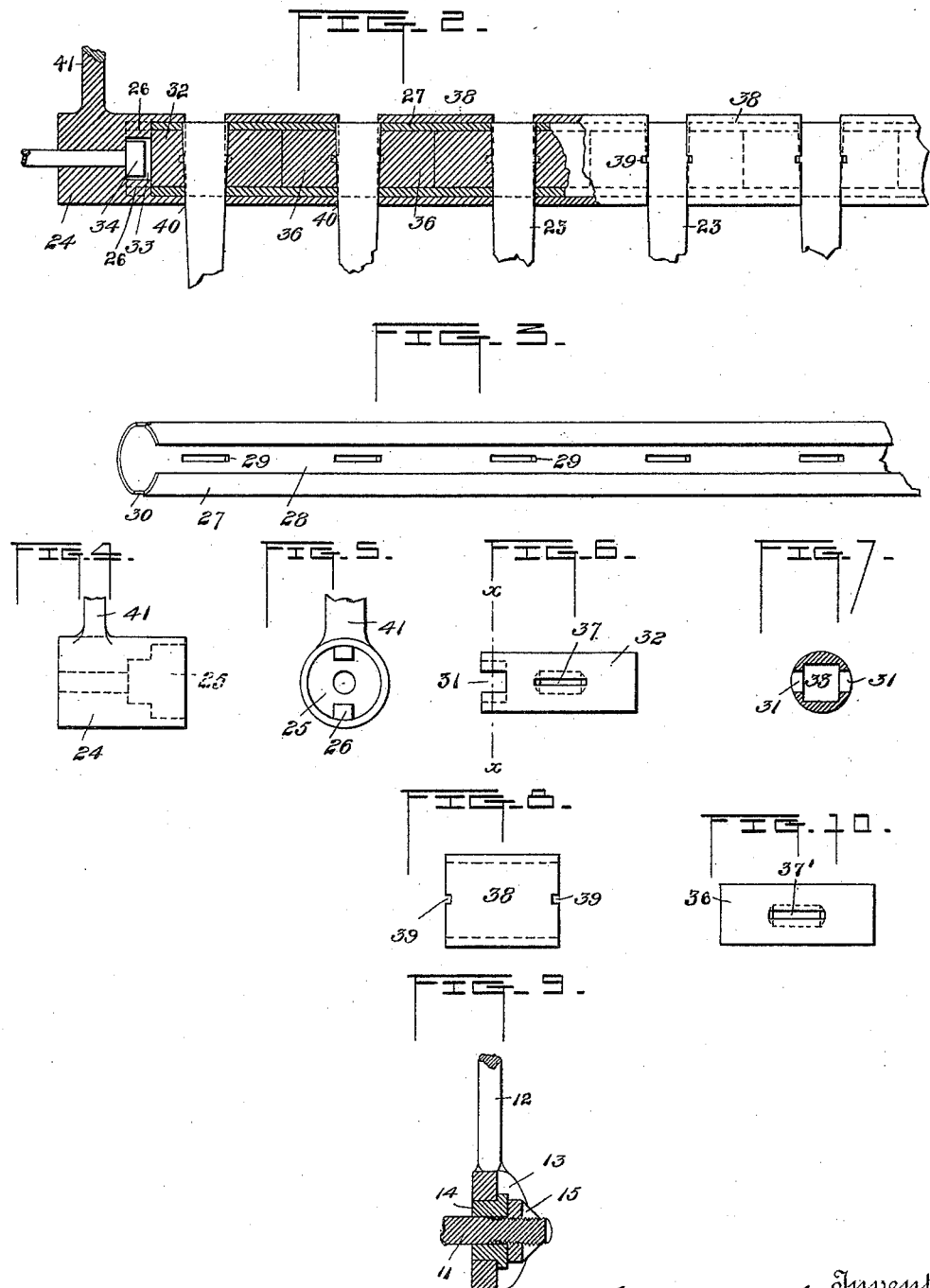

THOMAS J. THORP, OF CHICAGO, ILLINOIS, ASSIGNOR OF ONE-THIRD TO D. J. BRANNEN, OF FLAGSTAFF, ARIZONA TERRITORY.

HORSE HAY-RAKE.

SPECIFICATION forming part of Letters Patent No. 446,698, dated February 17, 1891.

Application filed October 4, 1890. Serial No. 367,115. (No model.)

*To all whom it may concern:*

Be it known that I, THOMAS J. THORP, a resident of Chicago, in the county of Cook and State of Illinois, have invented certain new and useful Improvements in Horse Hay-Rakes; and I do hereby declare the following to be a full, clear, and exact description of the invention, such as will enable others skilled in the art to which it appertains to make and use the same.

The object of the invention is to provide a horse hay-rake that can be made entirely or mainly of metal, and which shall have great strength and simplicity of parts and efficiency and convenience in use; and the invention consists in the construction hereinafter described, and particularly pointed out.

In the accompanying drawings, Figure 1 is a perspective of the rake. Fig. 2 is a partial section of the tooth-supporting shaft. Fig. 3 is a partial perspective of a hollow slotted sleeve forming part of the tooth-shaft. Fig. 4 is a rear elevation of a tooth-shaft, hub, or cap. Fig. 5 is an end elevation of the same. Fig. 6 is an elevation of a plug adapted to enter shaft-hub. Fig. 7 is a section of the said plug on line $x\ x$ of Fig. 6. Fig. 8 is an elevation of one of the exterior sleeves of the tooth-shaft. Fig. 9 is a partial section of vehicle shaft and bearing, and Fig. 10 is an elevation of a plug.

The rake-frame is made of metal tubes connected by suitable tubular couplings, such as indicated on the drawings at 1, 2, 3, and 4. The main frame consists, essentially, of four bents or end frames, two being located at each end, or one on each side of each wheel and adjacent thereto. The inner end frames are connected by the tube or rods 5 6 at the top and rear, and at the front their bottoms are connected by tubes or parts 7, 8, and 9. Tubes 7 and 8 are joined by cross-rods 10. These end frames and the entire body of the machine are supported upon the short axles 11 of the wheels by means of the upright 12.

13 is a plug or head secured to an axle and adapted to connect with a coupling 2, which constitutes in effect a part of the inner upright 12. Each exterior upright has also a head 13, which holds an axle-box 14, which is secured in position by a nut 15, screwing upon the threaded outer end of the axle. When the nut is removed, the upright 12 can be swung about its point of suspension and off from the axle.

A seat 16 is supported on the upper parallel members or tubes 5 6 of the frame by arms 17 17, which arms turn freely on tube 6.

18 18 are brackets connected to each other by rod 19. The tube passes through them and they have grooves adapted to receive and support the seat-arms. The brackets can be turned about tube 5 to raise or lower the seat, the holes through which the supporting-tube passes being eccentrically arranged for the purpose.

The tongue 20 is supported upon tube 7, joined by rods or tubes 10 to tube 8, and braced in any convenient manner.

21 21 denote steps and 22 22 platforms for convenience in mounting to the seat.

The rake-teeth 23 23 are supported upon a sectional shaft, the various parts of which are illustrated in Figs. 2 to 8, inclusive.

24 24 are hubs made to turn on studs or bearings extending inwardly from the uprights 12. The inner end of each hub is recessed at 25 and provided with lugs or projections 26.

27 denotes a partial tube, having a continuous slot 28 and shorter slots 29. This tube is provided with notches 30, adapted to engage the lugs 26 when the tube is entered in the recess 25 of the hub.

32 denotes a plug adapted to be placed in tube 27 and provided with slots 31, suitable for engaging the said lugs 26. It is also recessed at 33 to receive the head 34 of a stud or bearing supported in a coupling of an upright 12. 36 36 indicate a similar plug having slots 37'. Both forms of the plug are provided with a transverse opening 37 or 37', approximately wedge-shaped in form, the narrowest part of which is made somewhat longer than the other, as indicated in Figs. 2, 6, and 10. The purpose of each opening is to receive a tooth which also passes through a slot 29 in the tube 27, and is suitably keyed or wedged therein.

38 38 are rings fitted to the exterior of tube 27 and provided with notches 39 39 to permit the teeth to be entered between said rings and passed through slots 29 and 37 or 37' in the tube and plugs, respectively.

These parts are assembled as follows: The tube 27 and core or plug 32 are entered in the tube, as explained. A rake-tooth is entered through a slot 29 and through opening 37 or 37', the head of the tooth being made with inclined sides to fit the similar sides of the opening. The tooth does not, however, fit transversely the enlarged part of the opening, (indicated by dotted lines in Figs. 6 and 10,) and some play of the tooth in a vertical plane is thereby allowed, while its extreme end is held in fixed position by fitting a slot 29. A sleeve 38 is next passed over the tube 27 and placed, as shown, so that its lower margin bears against the edge of the tooth adjacent. A plug 36 is next inserted and then another tooth and sleeve are put in place, the arrangement of the plugs, teeth, and sleeves being such that the latter surround or break the joints between the plugs, and when turned, as in Fig. 1, cover a part of the ends of the teeth. The sleeves are provided at each end with notches 39 to allow the insertion of teeth, after which the sleeves are partially rotated to lock them. When it is desired to remove one or more of the teeth, the sleeve or sleeves are turned back to bring the notches in coincidence with the ends of the teeth, whereupon the latter can be pushed out of the slot in the head and through the said notches.

The rake is raised and lowered by the following-described mechanism: 41 41 denote arms affixed to the hubs 24 24, and 42 42 similar arms having a fixed connection with the tube or rod 9. The outer ends of these arms are connected by rods or arms 43 43, loosely pivoted to the arms at each end of said rods, respectively. The bar or tube 9 is pivotally supported in its bearings, and is provided with crank-treadles 44 44, by which it can be partially turned in said bearings. When so turned, the hubs 24 are also simultaneously turned, by which means also the rake-head is turned and the teeth raised or lowered, as the case may be.

45 denotes a treadle-plate affixed to rod 9, and 46 a notched spring-bar made fast on the tongue, by which the rod 9 and connected parts can be held in position. The spring-bar can be released by the foot.

The smaller parts of the frame above described may be of solid rods, if desired, though the tubular form is preferred. The couplings are all preferably screw-threaded. Particular parts of the frame, including the braces or cross-connections, can be varied in number, location, and arrangement by mechanical skill.

The machine, including the frame, can be taken apart for the purpose of transportation or storage, and the parts can be reassembled by use of ordinary tools, and parts that may become accidentally broken or bent or that are worn can be easily replaced with new ones.

Having thus described my invention, what I desire to secure by Letters Patent is—

1. In a horse hay-rake, the wheels provided each with a separate axle and end frames, one on each side of each wheel, connected by transverse tubes or members located at the top and rear above the rake and also connected by the tubes at the front and bottom in a plane below the rake-head, said end frames being each supported upon an axle, substantially as set forth.

2. In a horse hay-rake, the wheels provided each with a separate axle and frames connected by transverse tubes or members located at the top and rear and also connected by the tubes at the front and bottom, said end frames being each supported upon an axle, a seat supported upon the upper transverse tube, and a tongue supported on the lower transverse tubes of said main frame, substantially as set forth.

3. In a horse hay-rake, the wheels having short axles, the frame supported upon said axles and extending above the axles, the shaft or rake-head having each end pivotally connected to the frame above the axles, a rod located below the rake-head and in front thereof and near the front of the wheels, arms rigidly joined to said rod, arms in like manner joined to the rotatable rake-head, and a connecting-rod loosely connecting the outer ends of said arms, substantially as set forth.

4. In a horse hay-rake, the wheels having short axles, the frame supported upon said axles, the shaft or rake-head having its main part 27 coupled with the hubs, said hubs provided with bearings in the frame, and devices for securing the rake-teeth in the head, substantially as set forth.

5. In a horse hay-rake, the rake proper, comprising the teeth, and the head composed of the slotted tube 27, the heads 24 24, the plugs, and the rings or sleeves 38, the heads having a pivotal connection with the rake-frame, and the several parts being secured and arranged substantially as set forth.

6. In a horse hay-rake, the short axles 11, provided with the head 13 and having a screw-threaded end, the sleeves 14, and the securing-nut, in combination with the rake-frame having the uprights 12, substantially as set forth.

7. The notched spring-bar 46, treadle-plate 45, fixed on the journaled rod 9, the rake-head, and the arms and rod connecting said head to rod 9, all combined substantially as set forth.

In testimony whereof I have signed this specification in the presence of two subscribing witnesses.

THOMAS J. THORP.

Witnesses:
BENJ. R. CATLIN,
ARCHIE M. CATLIN.